US008711441B2

(12) United States Patent
Shimizu

(10) Patent No.: US 8,711,441 B2
(45) Date of Patent: Apr. 29, 2014

(54) IMAGE FORMING APPARATUS, IMAGE FORMING METHOD, AND COMPUTER READABLE MEDIUM FOR IDENTIFYING TARGET-RECORDING ELEMENT USING DETECTION PATTERN

(75) Inventor: Tohru Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 310 days.

(21) Appl. No.: 13/206,140

(22) Filed: Aug. 9, 2011

(65) Prior Publication Data

US 2012/0162721 A1 Jun. 28, 2012

(30) Foreign Application Priority Data

Dec. 28, 2010 (JP) ................................ 2010-293833

(51) Int. Cl.
*H04N 1/40* (2006.01)

(52) U.S. Cl.
USPC ............ 358/448; 358/501; 358/504; 358/521

(58) Field of Classification Search
USPC .......................................................... 358/448
See application file for complete search history.

(56) References Cited

U.S. PATENT DOCUMENTS

2003/0085940 A1* 5/2003 Yamada .......................... 347/19

FOREIGN PATENT DOCUMENTS

| | | |
|---|---|---|
| JP | A-61-261079 | 11/1986 |
| JP | A-10-336428 | 12/1998 |
| JP | A-2005-246649 | 9/2005 |
| JP | A-2006-181842 | 7/2006 |
| JP | A-2009-154408 | 7/2009 |

* cited by examiner

*Primary Examiner* — Steven Kau
*Assistant Examiner* — Andrew H Lam
(74) *Attorney, Agent, or Firm* — Oliff PLC.

(57) ABSTRACT

An image forming apparatus includes an image forming unit, a reading unit, a controller, and an identifying unit. The image forming unit includes multiple recording elements arrayed in a first predetermined direction and drives the recording elements in accordance with input image information so as to form an image on a recording medium that moves relatively to the recording elements in a second direction orthogonal to the first direction. The reading unit reads the image formed by the image forming unit and outputs read data. The controller controls the image forming unit so as to form a detection pattern in a detection-pattern region located upstream or downstream, in the second direction, of a region where the image is formed in the recording medium. The identifying unit identifies a target recording element on the basis of read data obtained by reading the detection pattern using the reading unit.

10 Claims, 11 Drawing Sheets

IMAGE FORMING APPARATUS, IMAGE FORMING METHOD, AND COMPUTER READABLE MEDIUM FOR IDENTIFYING TARGET-RECORDING ELEMENT USING DETECTION PATTERN

CROSS-REFERENCE TO RELATED APPLICATIONS

This application is based on and claims priority under 35 USC 119 from Japanese Patent Application No. 2010-293833 filed Dec. 28, 2010.

BACKGROUND

Technical Field

The present invention relates to image forming apparatuses, image forming methods, and computer readable media.

SUMMARY

According to an aspect of the invention, there is provided an image forming apparatus including an image forming unit, a reading unit, a controller, and an identifying unit. The image forming unit includes multiple recording elements arrayed in a first predetermined direction and drives the recording elements in accordance with input image information so as to form an image on a recording medium that moves relatively to the recording elements in a second direction orthogonal to the first direction. The reading unit reads the image formed by the image forming unit via an optical system and outputs read data. The controller controls the image forming unit so as to form a detection pattern in a detection-pattern region located upstream or downstream, in the second direction, of a region where the image according to the input image information is formed in the recording medium such that other images are not continuous with the detection pattern. Specifically, the detection pattern includes stepped patterns arranged such that ends thereof are aligned with each other in the first direction. The stepped patterns respectively correspond to multiple groups of the recording elements obtained by dividing the multiple recording elements arrayed in the first direction into groups that include the same number of successively-arrayed recording elements. The stepped patterns each include patterns having the same length and extending in the second direction. The patterns included in each stepped pattern respectively correspond to the recording elements included in the corresponding group of the recording elements. The patterns are arranged such that front and rear ends of patterns corresponding to adjacent recording elements are connected to each other. The identifying unit identifies a target recording element on the basis of read data obtained by reading the detection pattern using the reading unit.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the drawings. The following description is directed to a case where an image forming apparatus according to an exemplary embodiment of the present invention is applied to an inkjet-type liquid-droplet ejecting apparatus.

Figure 1:
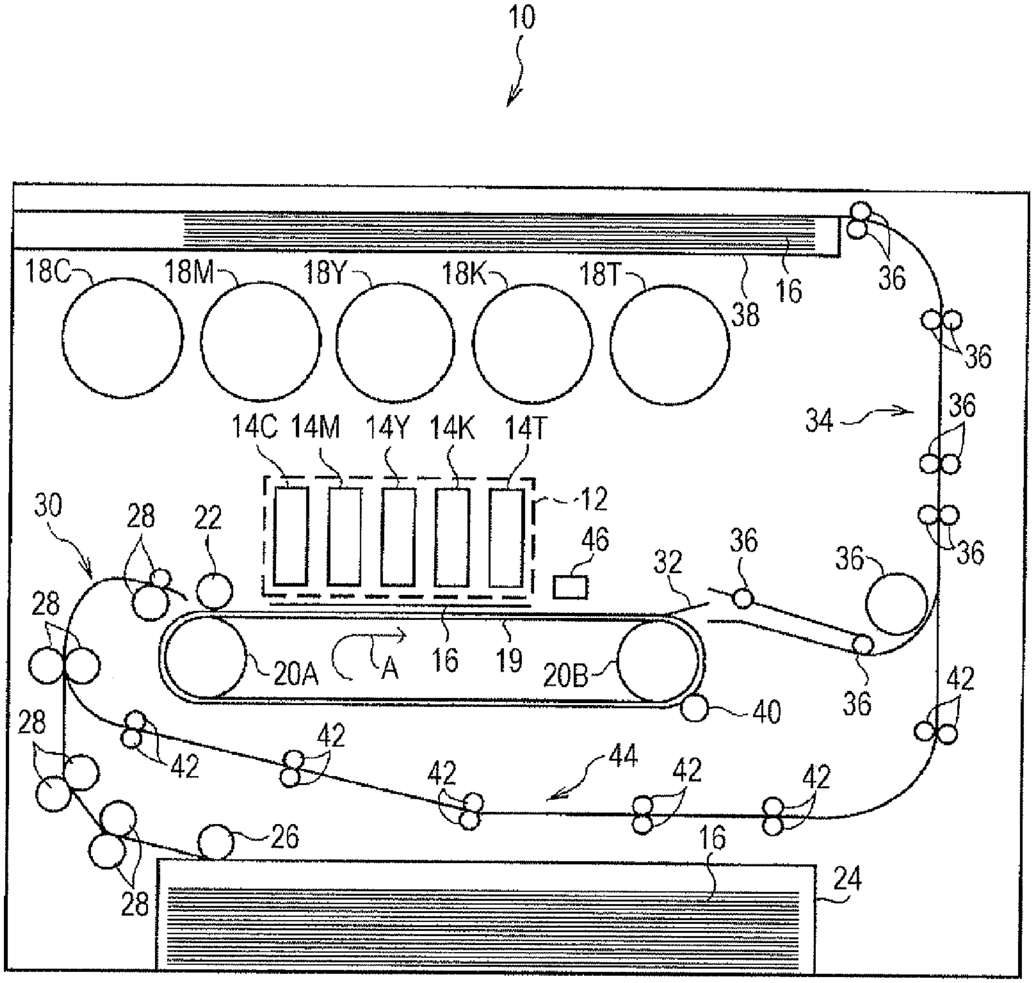
FIG. 1 schematically illustrates the overall configuration of a liquid-droplet ejecting apparatus according to an exemplary embodiment of the present invention.

FIG. 1 schematically illustrates the overall configuration of an inkjet-type liquid-droplet ejecting apparatus 10 according to this exemplary embodiment.

The liquid-droplet ejecting apparatus 10 includes a recording head array 12. The recording head array 12 includes five recording heads 14C, 14M, 14Y, 14K, and 14T respectively corresponding to a cyan ink liquid (C), a magenta ink liquid (M), a yellow ink liquid (Y), a black ink liquid (K), and a treatment liquid (T).

The recording heads 14C, 14M, 14Y, 14K, and 14T each have a print width that is larger than or equal to the width of a recording area. The recording heads 14C, 14M, 14Y, 14K, and 14T are fixed in place and eject ink droplets and treatment-liquid droplets from ejection nozzles toward transported recording paper 16 so as to form an image at, for example, 1200 dpi on the basis of image data input to the liquid-droplet ejecting apparatus 10. The treatment liquid is achromatic or hypochromic and is ejected after the ink liquids have landed on the recording paper 16 so as to reduce spreading of the ink and improve the image quality.

The recording heads 14C, 14M, 14Y, 14K, and 14T are respectively connected to ink cartridges 18C, 18M, 18Y, 18K, and 18T, which store the CMYK ink liquids and the treatment liquid, via tubes (not shown), so that the recording heads 14C, 14M, 14Y, 14K, and 14T are supplied with the ink liquids and the treatment liquid. The inks used here may be of various known types, such as water-based ink, oil-based ink, or solvent-based ink.

The liquid-droplet ejecting apparatus 10 includes an endless transport belt 19 below the recording head array 12. The transport belt 19 is wrapped around driving rollers 20A and 20B and rotates in a direction indicated by an arrow A, which is the clockwise direction, in FIG. 1 in response to a rotational force of the driving rollers 20A and 20B. The transport belt 19 is flat when facing the recording head array 12, and the recording paper 16 is transported to this flat region. Then, the recording heads 14C, 14M, 14Y, and 14K eject ink droplets onto the recording paper 16 so as to form an image thereon. In this case, the recording heads 14C, 14M, 14Y, and 14K eject the ink droplets onto the recording paper 16 from the respective ejection nozzles with a certain time lag therebetween. Thus, the ink droplets of the respective colors are superimposed on the recording paper 16, thereby forming the image.

The liquid-droplet ejecting apparatus 10 includes a charging roller 22 at an upstream side, in the driving direction, of the region of the transport belt 19 that faces the recording head array 12. The charging roller 22 is supplied with predetermined voltage and nips the transport belt 19 and the recording paper 16 together with the driving roller 20A while being driven by the driving roller 20A, thereby electrically charging the recording paper 16. The recording paper 16 electrically charged by the charging roller 22 is electrostatically attached to the transport belt 19 so as to be transported by the rotating transport belt 19.

Multiple sheets of recording paper 16 are stacked on a feed tray 24 provided at a lower inner section of the liquid-droplet ejecting apparatus 10. The multiple sheets of recording paper 16 are fed one-by-one from the feed tray 24 by a pickup roller 26, and each sheet of recording paper 16 is transported toward the transport belt 19 by a recording-paper transport unit 30 having multiple transport rollers 28.

A separation plate 32 is disposed downstream, in the driving direction in FIG. 1, of the region of the transport belt 19 that faces the recording head array 12. The separation plate 32 separates the recording paper 16 from the transport belt 19. The recording paper 16 separated from the transport belt 19 is transported by multiple discharge rollers 36 constituting a discharge transport unit 34 and is discharged to a paper output tray 38 provided at an upper section of the liquid-droplet ejecting apparatus 10.

A cleaning roller 40 that nips the transport belt 19 together with the driving roller 20B is disposed downstream of the separation plate 32 in the rotating direction of the transport belt 19 in FIG. 1. The cleaning roller 40 cleans the surface of the transport belt 19.

The recording paper 16 having the image formed on one face thereof is transported again to the transport belt 19 by an inversion transport unit 44 constituted of multiple inverting rollers 42 so that another image is formed on the other face. The inversion transport unit 44 branches off from the discharge transport unit 34 and transports the recording paper 16 toward the recording-paper transport unit 30.

An optical sensor 46 is disposed downstream, in the rotating direction of the transport belt 19 in FIG. 1, of the region of the transport belt 19 that faces the recording head array 12 but upstream of the separation plate 32. The optical sensor 46 is, for example, a charge-coupled-device (CCD) line sensor or a CCD area sensor and reads, for example, a detection pattern, which is formed as a result of ejection of ink from the ejection nozzles, at predetermined reading resolution. In this exemplary embodiment, the detection pattern is read at 500 dpi by 100 dpi, which is lower than the resolution used for image formation.

Figure 2:
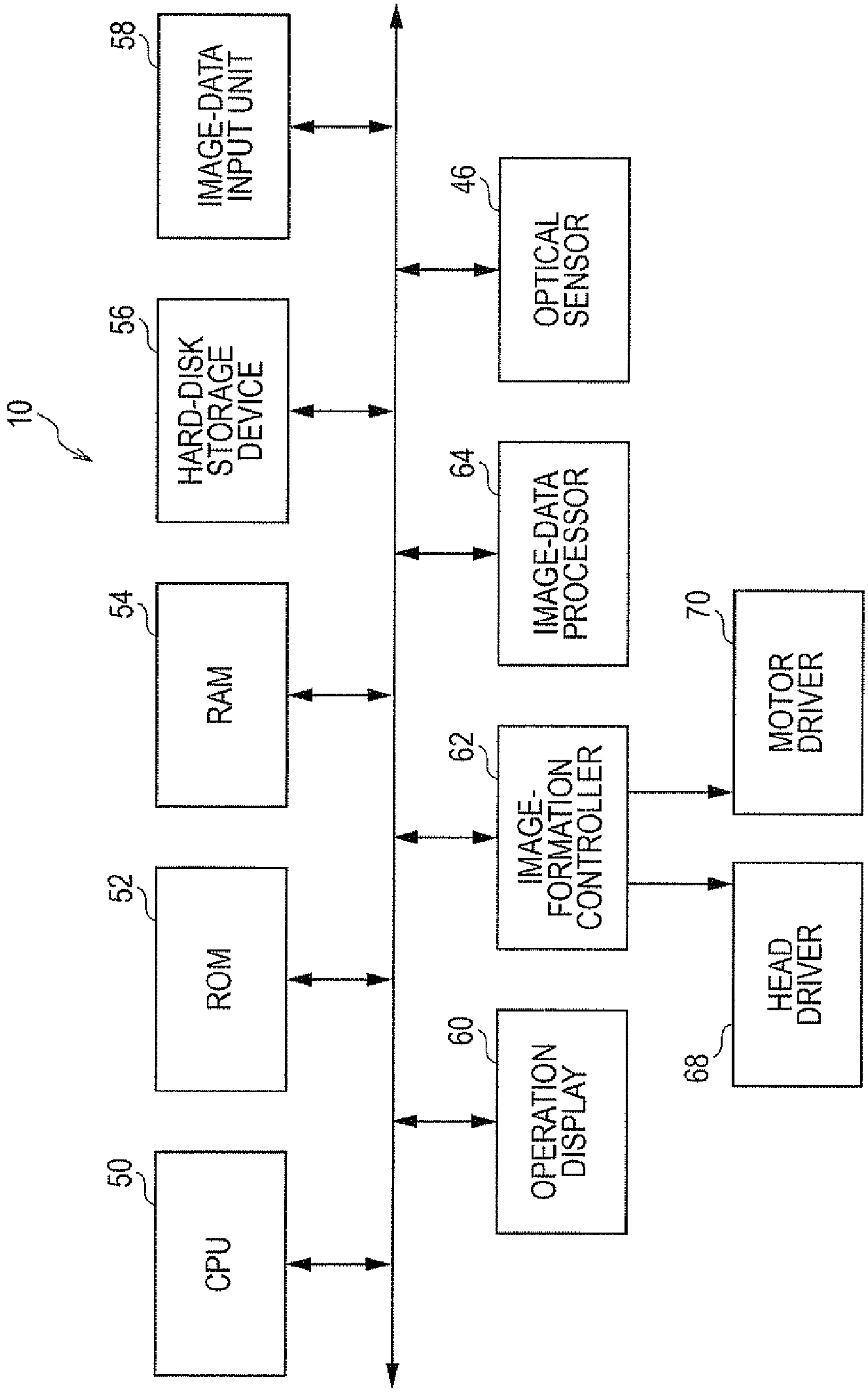
FIG. 2 is a block diagram illustrating a relevant part of a control system in the liquid-droplet ejecting apparatus according to the exemplary embodiment.

FIG. 2 illustrates a relevant part of a control system in the liquid-droplet ejecting apparatus 10.

The liquid-droplet ejecting apparatus 10 includes a central processing unit (CPU) 50 that is in charge of the overall control of the liquid-droplet ejecting apparatus 10. The CPU 50 is connected to a read-only memory (ROM) 52, a random access memory (RAM) 54, a hard-disk storage device 56, an image-data input unit 58, an operation display 60, an image-formation controller 62, an image-data processor 64, and the optical sensor 46 via a bus, such as a control bus or a data bus.

The ROM 52 stores a control program for controlling the liquid-droplet ejecting apparatus 10. The RAM 54 is used as a workspace for processing various kinds of data. The hard-disk storage device 56 stores image data, detection pattern data for forming a detection pattern image, and various kinds of data related to image formation.

The image-data input unit 58 receives image data from a personal computer (not shown) or the like. The input image data is transmitted to the hard-disk storage device 56.

The operation display 60 includes a touch-screen having both an operating function and a display function, and operating buttons to be operated by a user for performing various kinds of operation. The operation display 60 receives, for example, a command for starting an image forming process on the recording paper 16 and notifies the user of the control status of the liquid-droplet ejecting apparatus 10.

In order to form an image on the recording paper 16 on the basis of the image data, the image-formation controller 62 controls a head driver 68 that drives the recording heads 14C, 14M, 14Y, 14K, and 14T and a motor driver 70 that drives motors (not shown) for the various rollers.

The image-data processor 64 performs image processing, such as ink-density adjustment, on the image data stored in the hard-disk storage device 56. Furthermore, the image-data processor 64 processes read data obtained by the optical sensor 46 reading the detection pattern.

The following description relates to the detection pattern used for detecting a non-ejection nozzle in this exemplary embodiment. Because the image forming process in this exemplary embodiment is identical among the recording heads 14C, 14M, 14Y, 14K, and 14T, the following description is directed to the detection pattern for one of the recording heads 14.

Figure 3:
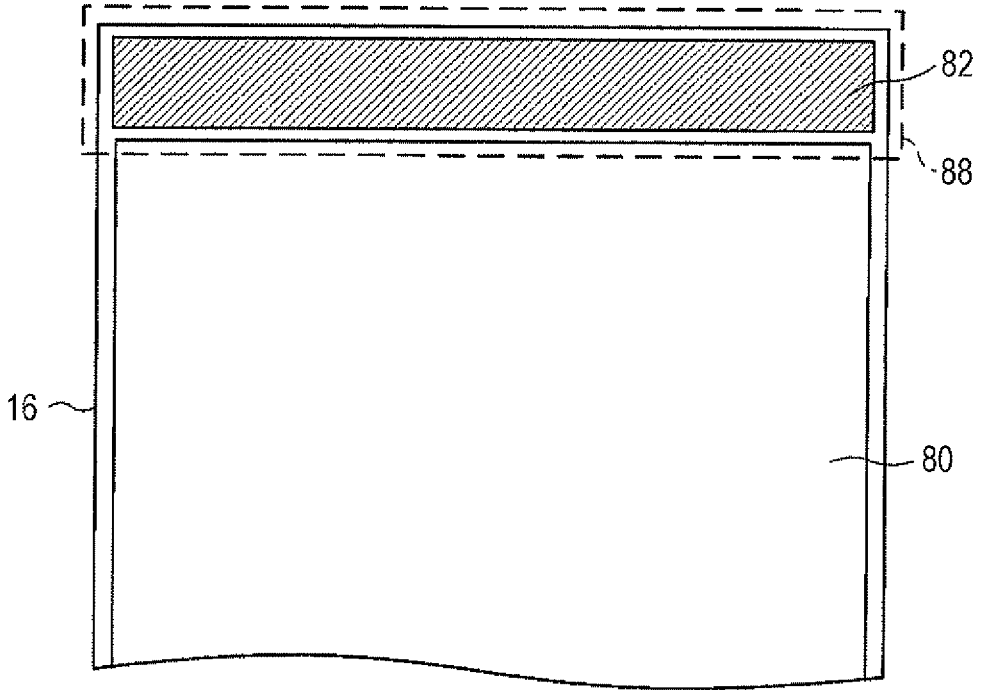
FIG. 3 is an image diagram for explaining a detection-pattern formation region and a first-image formation region.

Referring to FIG. 3, the detection pattern in this exemplary embodiment is formed on a single sheet of recording paper 16 together with an image (referred to as "first image" hereinafter) that the user desires it to be output. The recording paper 16 has a first-image formation region 80 where the first image is to be formed and a detection-pattern formation region 82 where the detection pattern is to be formed. The detection-pattern formation region 82 is provided in the form of a strip in an area upstream or downstream of the first-image formation region 80 in the transport direction of the recording paper 16. Although the following description is directed to a case where the detection-pattern formation region 82 is provided in an upstream area of the recording paper 16 in the transport direction thereof, the detection-pattern formation region 82 may alternatively be provided in a downstream area in the transport direction.

Figure 4:
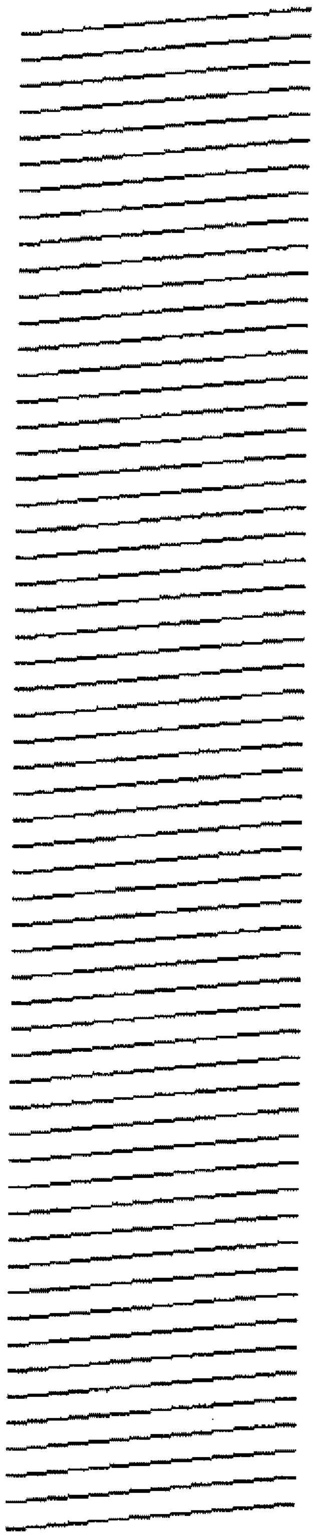
FIG. 4 is an image diagram illustrating an example of a detection pattern.
Figure 5:
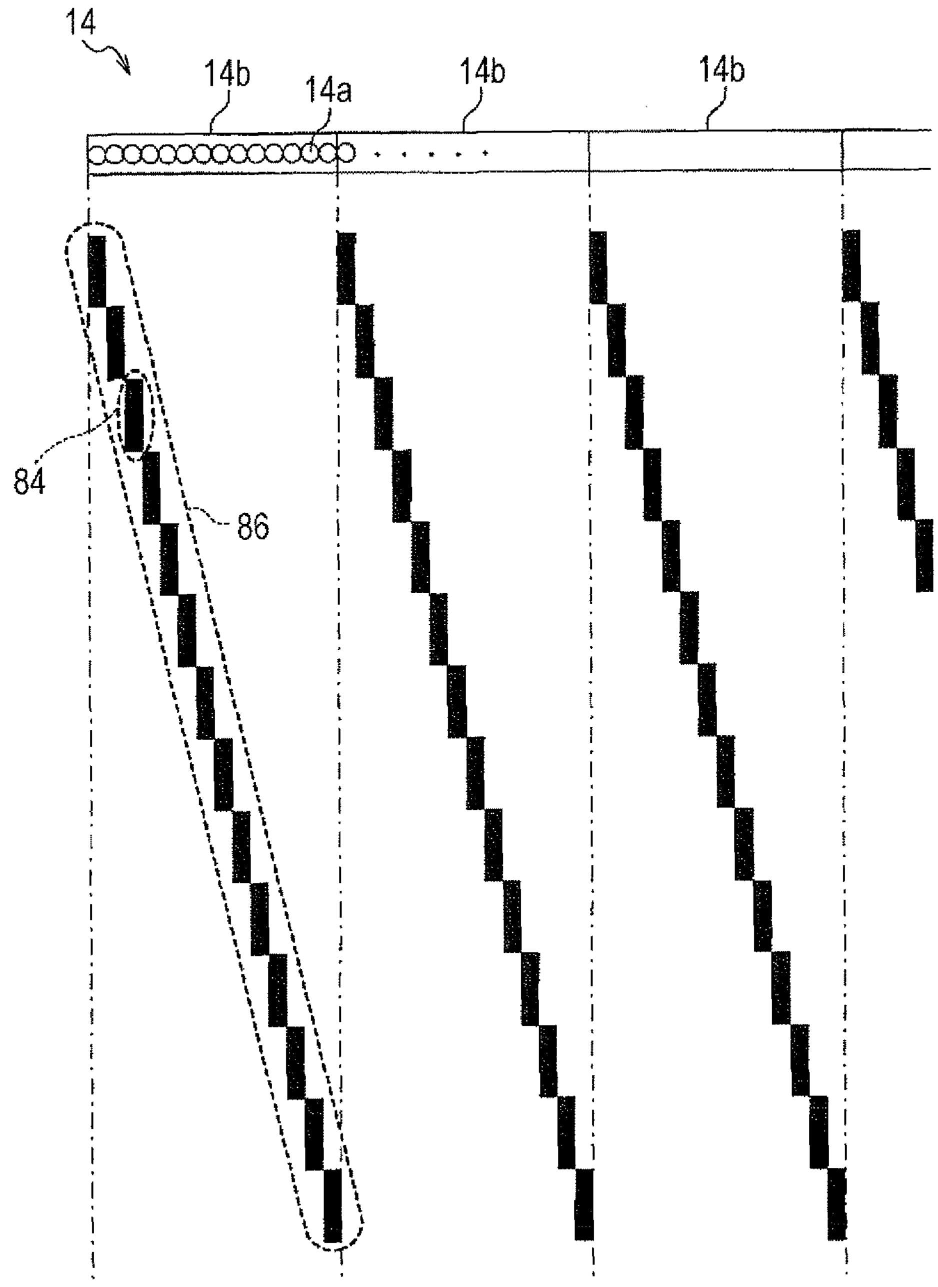
FIG. 5 is a partially enlarged view of the detection pattern and illustrates a correspondence relationship between the detection pattern and ejection nozzles.

Referring to FIG. 4, the detection pattern is constituted of multiple stepped patterns that are arranged in an array direction (first direction) of the ejection nozzles. Specifically, each stepped pattern includes linear patterns corresponding to the respective ejection nozzles and connected in the form of steps in the transport direction (second direction) of the recording paper 16. FIG. 5 is a partially enlarged view of the detection pattern and illustrates a correspondence relationship between the detection pattern and the respective ejection nozzles. As shown in FIG. 5, multiple ejection nozzles 14*a* are divided into multiple nozzle groups 14*b*. The nozzle groups 14*b* include the same number of successively-arrayed ejection nozzles 14*a*.

Linear patterns 84 are lines that correspond to the respective ejection nozzles 14*a* and extend by the same length in the transport direction of the recording paper 16. Specifically, the linear patterns 84 are lines formed of the same number of dots. For example, when a predetermined number of dots constituting one linear pattern 84 is completely formed by an ejection nozzle at the terminal end (in this case, the ejection nozzle at the left end) of the corresponding nozzle group 14*b*, the predetermined number of dots constituting another linear pattern 84 is subsequently formed by a second ejection nozzle from the left end of the nozzle group 14*b*. Thus, the linear patterns 84 are arranged at positions shifted from each other in the array direction of the ejection nozzles by a distance equivalent to the pitch between adjacent ejection nozzles. In this manner, each stepped pattern 86 extending in a stepwise manner in the transport direction is formed. The dots constituting each stepped pattern 86 do not necessarily need to be overlapped with (i.e., in contact with) each other.

The number of rows in each stepped pattern 86 corresponds to the number of ejection nozzles 14*a* included in each nozzle group 14*b*. Since the nozzle groups 14*b* include the same number of ejection nozzles 14*a*, and the linear patterns 84 corresponding to the respective ejection nozzles 14*a* have the same length, the stepped patterns 86 have the same shape. The stepped patterns 86 corresponding to the respective nozzle groups 14*b* are arranged such that the front ends or the rear ends of the stepped patterns 86 are aligned with each other in the array direction of the ejection nozzles 14*a*, whereby the detection pattern is formed.

Figure 6:
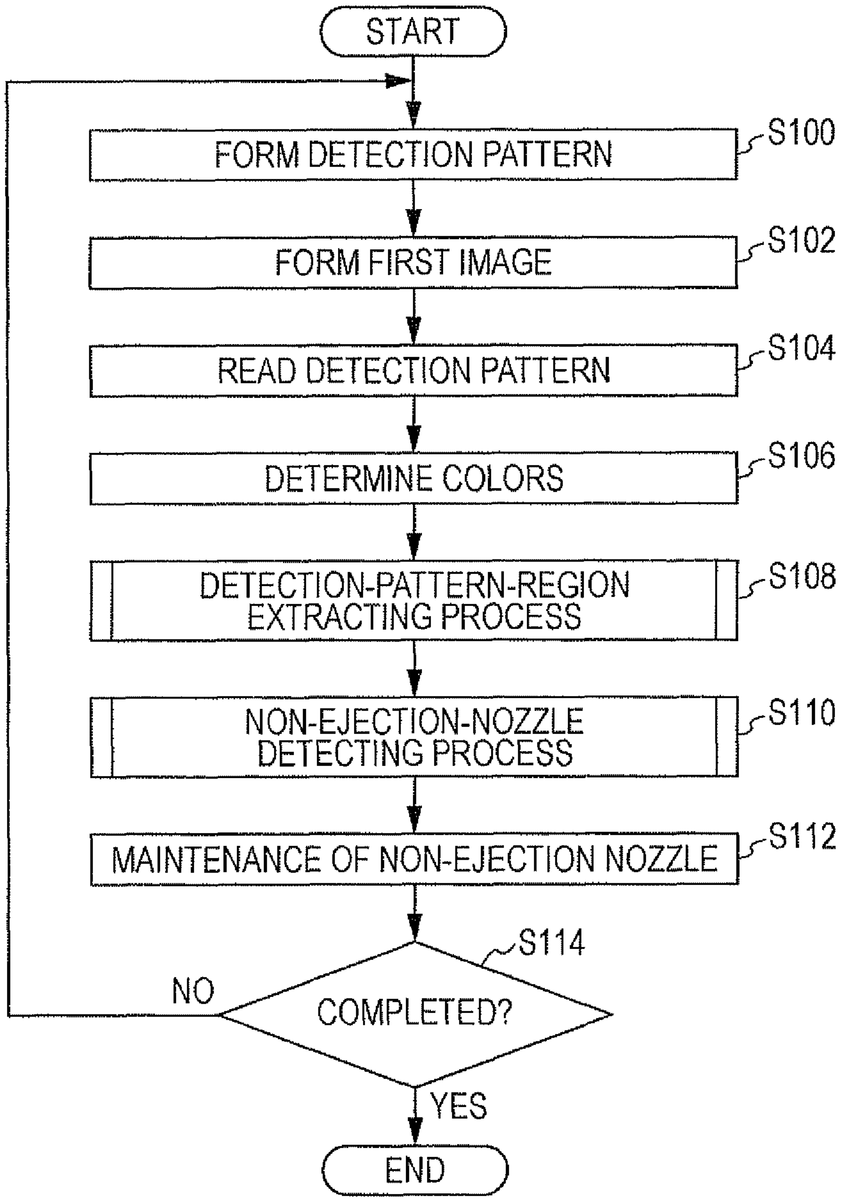
FIG. 6 is a flowchart illustrating the routine of an image forming process in the exemplary embodiment.

Next, the routine of the image forming process in this exemplary embodiment will be described with reference to FIG. 6. When image data is input, an image forming program stored in the ROM 52 is executed by the CPU 50, thereby commencing this routine.

In step S104, the recording head array 12 and the image-formation controller 62 form a detection pattern in the detection-pattern formation region 82 of the recording paper 16. More specifically, the recording paper 16 is transported in the transport direction, and liquid droplets are ejected to the detection-pattern formation region 82 from the ejection nozzle 14*a* at the left end of each nozzle group 14*b*. After the linear patterns 84 in the first row are formed as the recording paper 16 is transported, liquid droplets are ejected from the second ejection nozzle 14*a* from the left end of each nozzle group 14*b*. Accordingly, the linear patterns 84 in the second row are formed. By switching the ejection of liquid droplets from the current ejection nozzle 14*a* to the ejection nozzle 14*a* adjacent thereto at the rear end of each linear pattern 84 in this manner, a detection pattern having stepped patterns 86 arranged successively in the array direction of the ejection nozzles 14*a* is formed.

In step S102, a first image based on the input image data is formed in the first-image formation region 80.

In step S104, after the recording paper 16 is transported to a read position of the optical sensor 46, the optical sensor 46 reads the detection pattern formed on the recording paper 16 and outputs read data based on the detection pattern. In this case, a region to be read by the optical sensor 46 is, for example, a region 88 including the detection-pattern formation region 82 and a margin surrounding the detection-pattern formation region 82, as shown in FIG. 3. Regarding the stepped patterns 86 formed in the detection-pattern formation region 82, other images are not continuously formed around the periphery thereof. Specifically, the stepped patterns 86 are surrounded by a region where no images are formed and having a dimension equivalent to a predetermined number of pixels (e.g., at least three pixels) in the reading resolution of the optical sensor 46.

In step S106, the colors of the detection pattern are determined on the basis of RGB values in the read data.

In step S108, a detection-pattern-region extracting process, to be described later, is performed so as to extract a detection-pattern region. In step S110, a non-ejection-nozzle detecting process, to be described later, is performed so as to detect a non-ejection nozzle.

In step S112, a maintenance process, such as a suction process, is performed on the non-ejection nozzle detected in step S110 described above.

In step S114, it is determined whether or not to end the image forming process. If subsequent image data is input and the image forming process is not to be terminated, the process returns to step S100 to repeat the routine. When the process is completed for all input image data, the routine ends.

Figure 7:
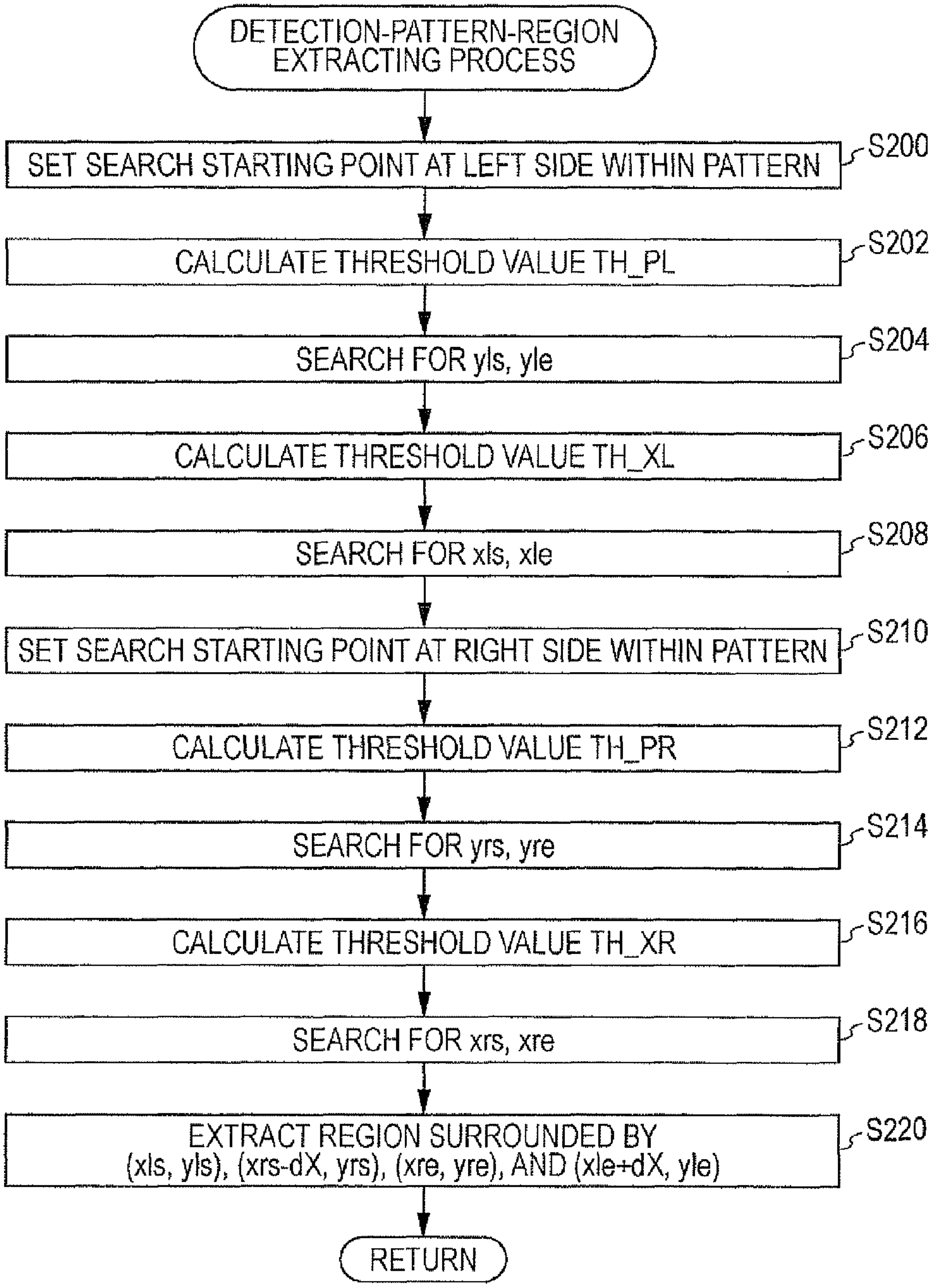
FIG. 7 is a flowchart illustrating the routine of a detection-pattern-region extracting process in the exemplary embodiment.
Figure 8:
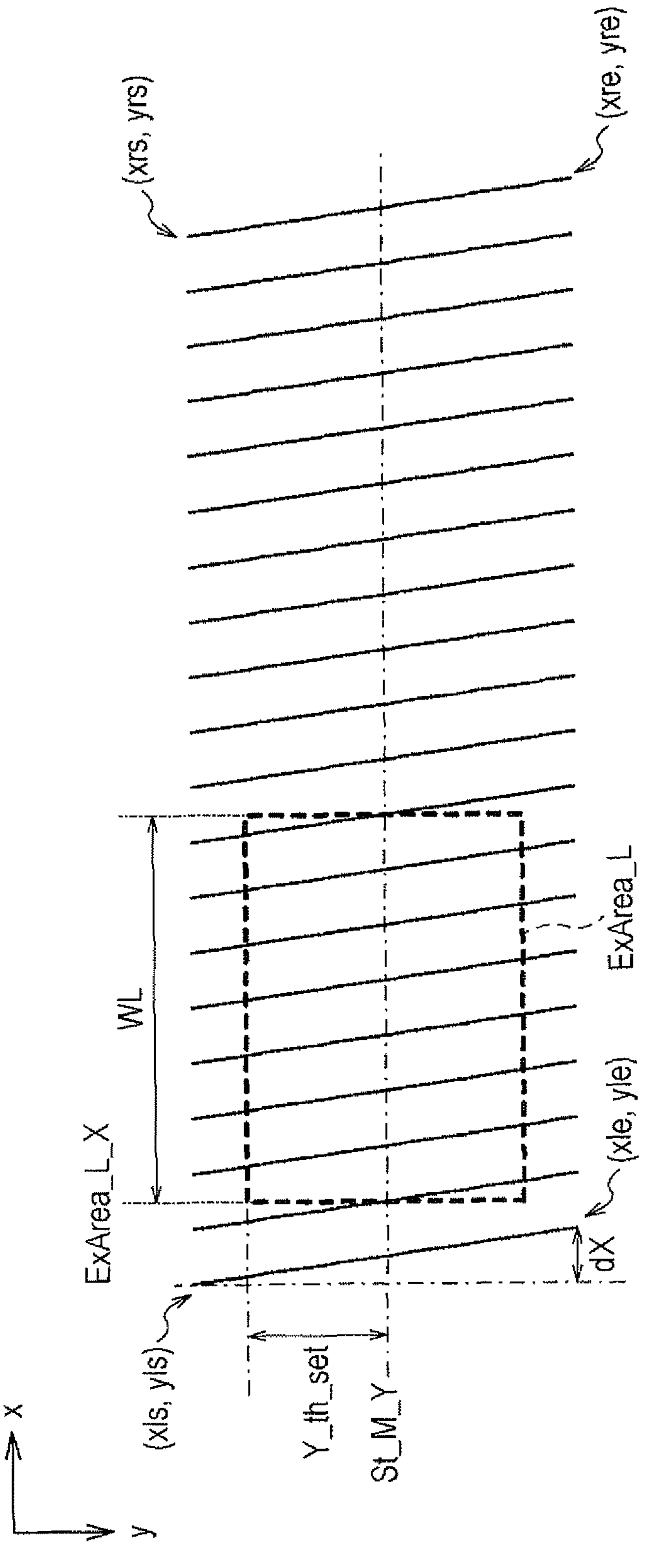
FIG. 8 is a diagram for explaining how a detection-pattern region is extracted.

Next, the routine of the detection-pattern-region extraction process will be described with reference to FIG. 7. Referring to FIG. 8, the following description is directed to a case where the detection-pattern region is extracted by detecting coordinates (xls, yls) of an upper left end of the detection pattern, coordinates (xle, yle) of a lower left end, coordinates (xrs, yrs) of an upper right end, and coordinates (xre, yre) of a lower right end when the array direction of the ejection nozzles 14*a* is defined as an x direction (i.e., the right side is the positive side) and the transport direction of the recording paper 16 is defined as a y direction (i.e., the lower side is the positive side). In FIG. 8, the detection pattern is expressed in a simplified form by expressing each stepped pattern with a single diagonal line and reducing the number of stepped patterns.

Figure 9:
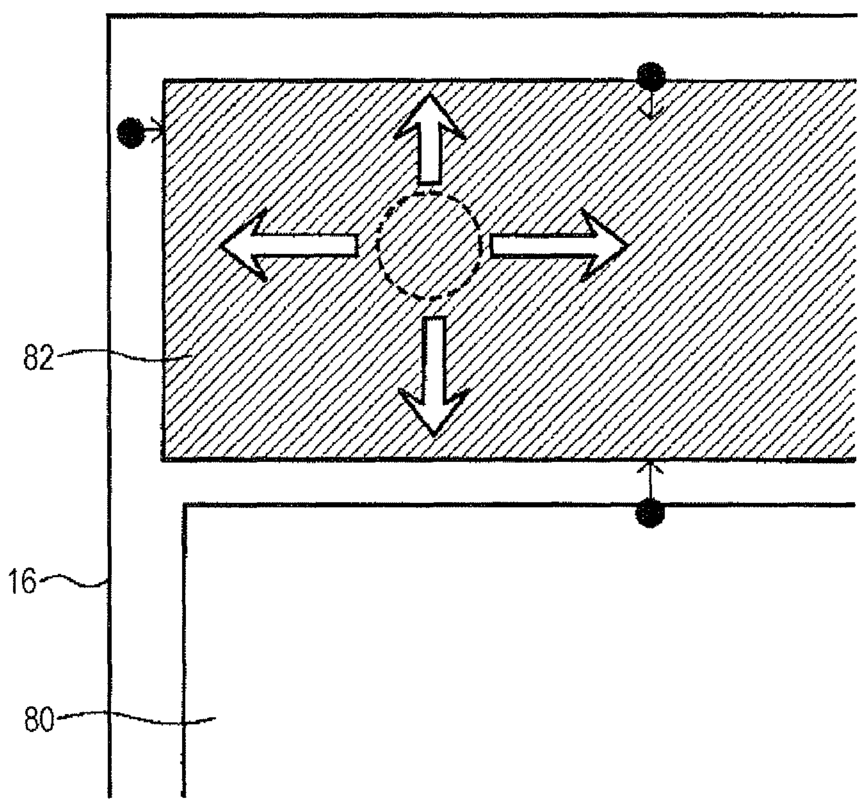
FIG. 9 is an image diagram for explaining how a search starting point is set.

In step S200, a search starting point for searching the edges of the detection pattern is set at the left side within the detection pattern. The reason for setting the search starting point within the detection pattern is to detect the density of the read data from the inside toward the outside of the detection pattern and search the edges of the detection pattern on the basis of a change in the density. An alternative method for searching for the edges of the detection pattern is shown in FIG. 9 in which search starting points (black dots in FIG. 9) are set outside the detection pattern such that the edges are searched from the outside toward the inside of the detection pattern. However, the positioning of such search starting points is difficult if the detection pattern is surrounded by a narrow margin, possibly causing the set search starting points to overlap the inside of the detection pattern or the first image. In contrast, setting a search starting point within the detection pattern allows for positioning in a wider range (e.g., a circular range indicated by dotted lines in FIG. 9), as compared with the case where search starting points are set outside the detection pattern. In addition, when a search starting point is set within the detection pattern, the detection pattern does not need to be surrounded by a wide margin, whereby the detection pattern can be formed in a smaller area of the recording paper 16.

Figure 10:
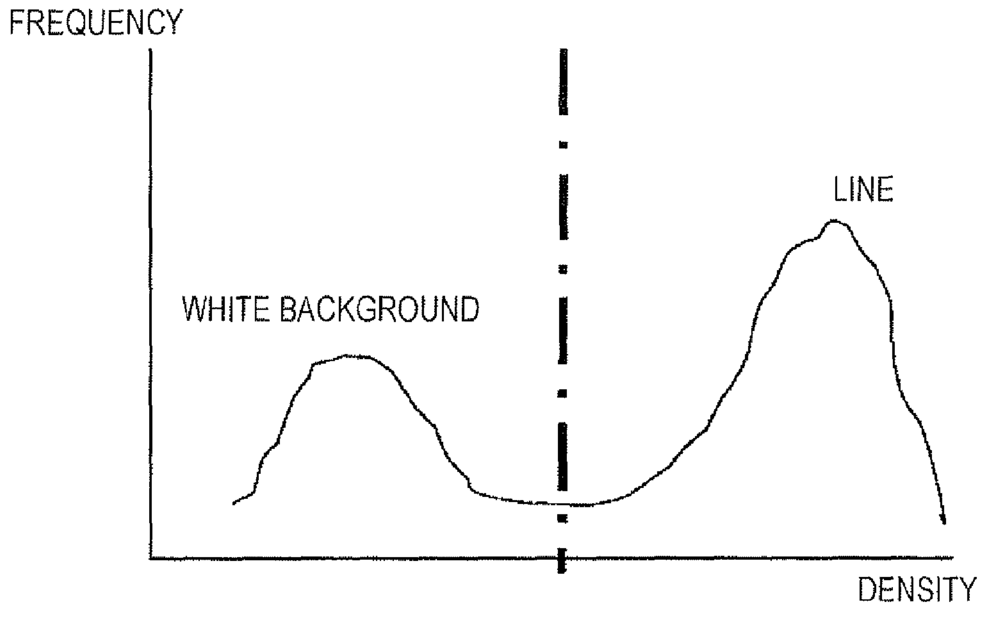
FIG. 10 illustrates an example of a density histogram used for setting a threshold value.

In step S202, a threshold value TH_PL used for searching for the y coordinates yls and yle is calculated. Specifically, an area ExArea_L set on the basis of an x coordinate ExArea_L_X determined from information such as an initiation ejection-nozzle number (normally "1") corresponding to the linear pattern 84 at the upper left end of the detection pattern, the total number of ejection nozzles, and an offset amount of the search starting point, a y-coordinate center value St_M_Y in the read data, and a predetermined width WL is identified. Then, for example, as shown in FIG. 10, a density histogram of pixels (pixel values) included in the area ExArea_L is generated. In this density histogram, an average value BK of pixel values (dark pixel values) down to a predetermined lower percentage and an average value WT of pixel values (bright pixel values) down to the aforementioned predetermined percentage are calculated, and the threshold value TH_PL is calculated on the basis of the following expression (1).

$$TH\_PL=(BK+WT)/2 \quad (1)$$

In step S204, a density histogram of pixels on a line segment between a point (ExArea_L_X, St_M_Y−n) and a point (ExArea_L_X+WL, St_M_Y−n) is generated while incrementing the value n by one from an initial value of zero, that is, while shifting the line segment in the y-negative direction by one line, and an average value Hb(y) within a predetermined lower percentage range is calculated. A y coordinate (St_M_Y−n)+1 corresponding to when the average value Hb(y) is determined as being greater than the threshold value TH_PL calculated in step S202 is defined as "yls". Similarly, a density histogram of pixels on a line segment between a point (ExArea_L_X, St_M_Y+n) and a point (ExArea_L_X+WL, St_M_Y+n) is generated while incrementing the value n by one from the initial value of zero, that is, while shifting the line segment in the y-positive direction by one line, and an average value Hb(y) within the predetermined lower percentage range is calculated. A y coordinate (St_M_Y+n)−1 corresponding to when the average value Hb(y) is determined as being greater than the threshold value TH_PL calculated in step S202 is defined as "yle".

In step S206, a threshold value TH_XL used for searching for the x coordinates xls and xle is calculated. Specifically, an average value Vb(x) of the density of pixels on a line segment between a point (ExArea_L_X−n, yls) and a point (ExArea_L_X−n+dX, yle) until reaching x=0 (i.e., the left end of the read data) is calculated while incrementing the value n by one from the initial value of zero, that is, while shifting the line segment in the x-negative direction by one line. In this case, "dX" is a value expressed by the following expression (2), and the line segment is parallel to the stepped patterns.

$$dx=(\text{number of rows in stepped pattern})\times(\text{resolution of optical sensor})/(\text{print resolution}) \quad (2)$$

Then, a maximum value Vb(x)MAX (brightest) of the average value Vb(x) and a minimum value Vb(x)MIN (darkest) of the average value Vb(x) are calculated within the range x=0 to ExArea_L_X, and the threshold value TH_XL is calculated from the following expression (3).

$$TH\_XL=(Vb(x)\text{MAX}\ Vb(x)\text{MIN})/2+Vb(x)\text{MIN} \quad (3)$$

In step S208, it is determined whether or not the average value Vb(x) of the density of pixels on the line segment between the point (ExArea_L_X−n, yls) and the point (ExArea_L_X−n+dX, yle) calculated in step S206 is greater than the threshold value TH_XL calculated in step S206 in successive a pixels, that is, whether or not there is a sufficient continuous blank space. The number of a pixels can be set in correspondence with a width that is larger than the width of the stepped patterns in the x direction, and the a pixels can be set on the basis of the following expression (4) by using a parameter C.

$$\alpha=dX\times C \quad (4)$$

If it is determined that the average value Vb(x) is greater than the threshold value TH_XL in successive α pixels, an x coordinate (ExArea_L_X−n+1) corresponding to when Vb(x)>TH_XL is defined as "xls", and "xls+dX" is defined as "xle".

In steps S210 to S218, a process similar to that in steps S200 to S208 described above is performed on the right side of the detection pattern so as to search for "yrs", "yre", "xrs", and "xre".

In step S220, a region surrounded by the coordinates (xls, yls), (xrs−dX, yrs), (xre, yre), and (xle+dX, yle) are extracted as a detection-pattern region before returning to the original routine of the image forming process.

The methods for calculating the threshold values are not limited to the above-described methods. Moreover, a threshold value TH_PL_top for "yls" and a threshold value TH_PL_btm for "yle" may be calculated separately. Furthermore, if the average value Hb(y) does not exceed the threshold value TH_PL even when the search is performed to the ends of the read data in the y direction or if the average value Vb(x) does not exceed the threshold value TH_XL even when the search is performed to the ends of the read data in the x direction, it may be determined that the search has failed, and the process may be terminated. Furthermore, the same process may be repeated for a predetermined number of times (e.g. three times) before determining that the search has failed.

Although the process described above is performed by dividing the detection pattern into two areas, i.e., the left area and the right area, if the width in the x direction is large or if a single piece of read data is used by joining read data output from multiple optical sensors, the detection pattern may be segmented into multiple areas at the center of the read data in the x direction or at the joints of the read data, and the above-described process may be performed on each segmented area. Thus, the accuracy of extracting the detection-pattern region can be maintained even when the width is large in the x direction.

Figure 11:
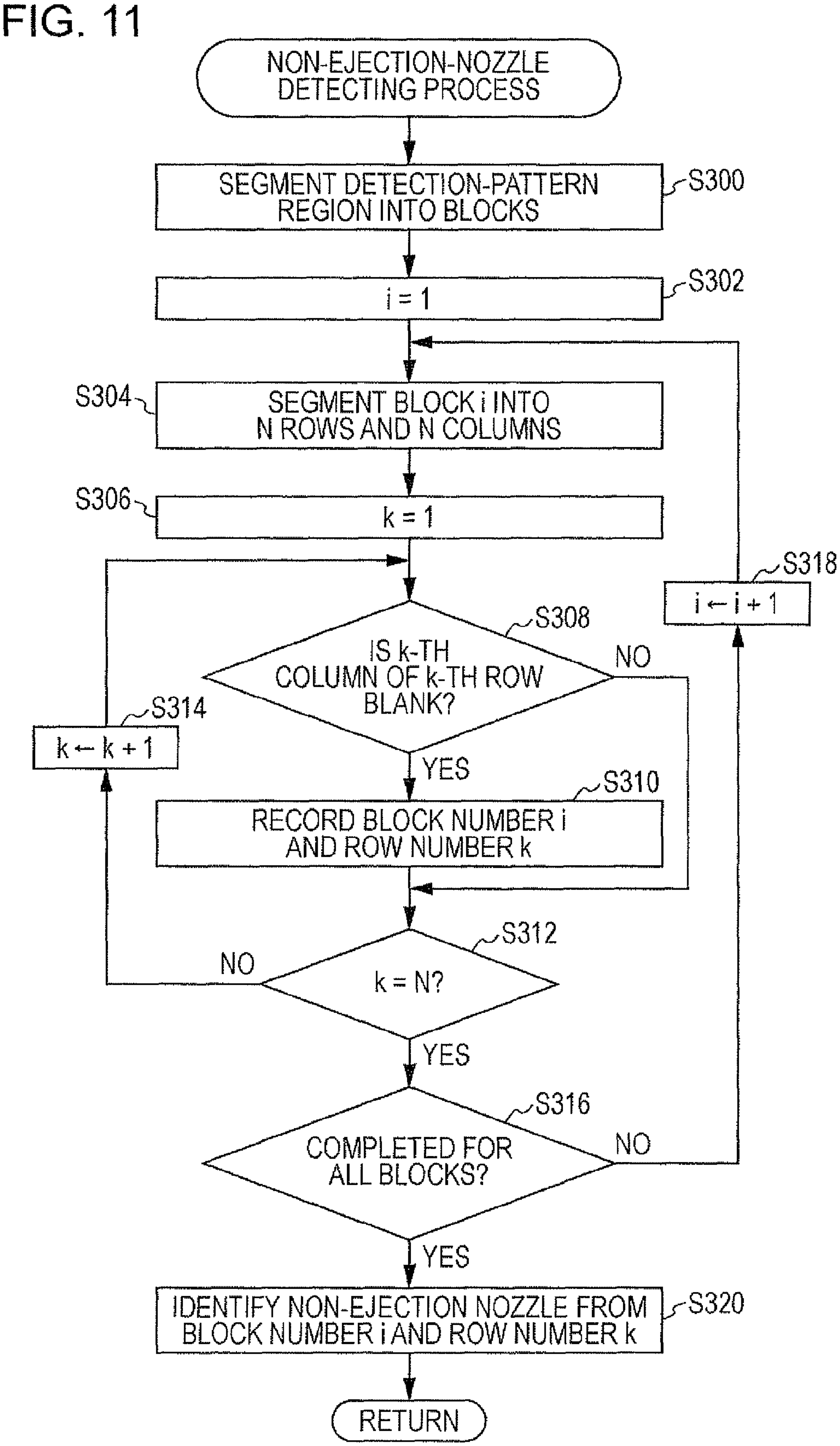
FIG. 11 is a flowchart illustrating the routine of a non-ejection-nozzle detecting process in the exemplary embodiment.

Next, the routine of the non-ejection-nozzle detecting process will be described with reference to FIG. 11.

Figure 12:
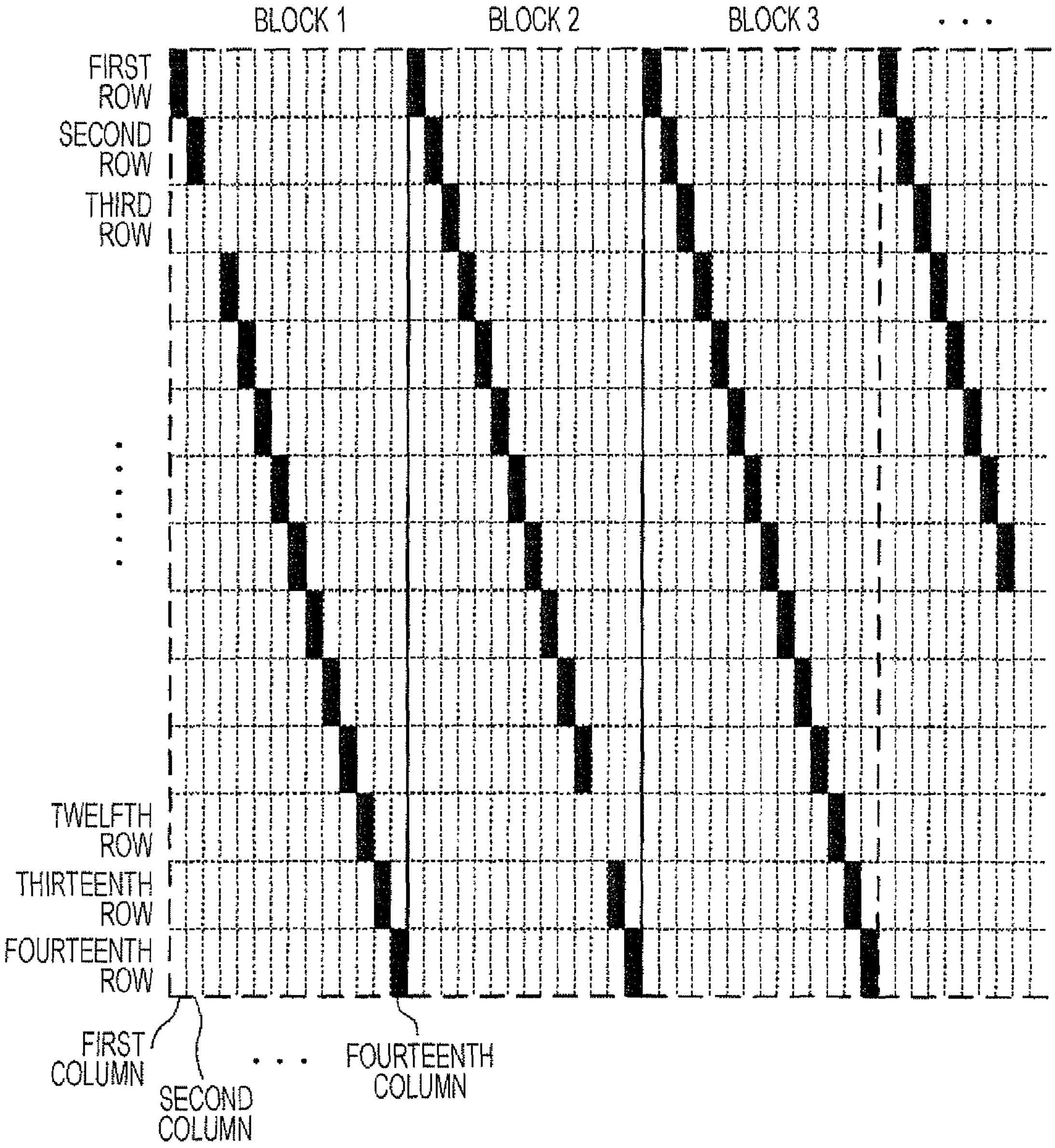
FIG. 12 is an image diagram for explaining how a non-ejection nozzle is identified.

In step S300, the detection-pattern region extracted as the result of the detection-pattern-region extracting process is segmented into the same number of blocks as the number of nozzle groups, as shown in FIG. 12. Thus, a single stepped pattern 86 exists in each block, such that the linear pattern 84 in the uppermost row of the stepped pattern 86 is located at the upper left end of the block and the linear pattern 84 in the lowermost row of the stepped pattern 86 is located at the lower right end of the block. Identification numbers 1, 2, and so on are allocated to the blocks in that order from the left end.

In step S302, a value "1" is set as a variable indicating the identification number of a block. In step S304, the block i is segmented into N rows in the y direction and N columns in the x direction. The value "N" corresponds to the number of ejection nozzles 14*a* included in each nozzle group 14*b*, that is, the number of rows in each stepped pattern 86 (in this case, N=14). Each block has a first row, a second row, . . . , a thirteenth row, and a fourteenth row in that order in the y-positive direction, and a first column, a second column, . . . , a thirteenth column, and a fourteenth column in that order in the x-positive direction.

In step S306, a value "1" is set as a variable k indicating the row number and the column number. In step S308, it is determined whether or not a linear pattern 84 exists in a k-th column of a k-th row in the block i. For example, a density histogram of pixels included in the block i is generated, as shown in FIG. 10, and a threshold value TH is calculated in the same manner as in the aforementioned expression (1). Then, if the density of the pixels in the k-th column of the k-th row exceeds the threshold value TH, it can be determined that a linear pattern 84 exists. As an alternative to the case where the density of all the pixels in the k-th column of the k-th row exceeds the threshold value, if the density of, for example, 80% or more of the pixels exceeds the threshold value, it may be determined that a linear pattern exists. Furthermore, the determination may be performed by using the pixel density corresponding to the center value of the y coordinate in the k-th column of the k-th row. Moreover, in view of displacement in the position of a linear pattern 84 or displacement in the extraction position of the detection-pattern region, the determination may be performed by additionally using the density of a predetermined number of pixels near the k-th column in the x direction.

If there is no linear pattern 84 and the k-th column of the k-th row is blank, the process proceeds to step S310 where the identification number i of the block and the row number k are recorded. Then, the process proceeds to step S312. In contrast, if there is a linear pattern 84 in the k-th column of the k-th row, the process skips step S310 and proceeds to step S312.

In step S312, it is determined whether or not the variable k is equal to N so as to determine whether or not the process is completed down to the lowermost row of the block i. If the process is not completed down to the lowermost row, the process proceeds to step S314 where the variable k is increased by one, and returns to step S308 so as to repeat the process. If k=N, the process proceeds to step S316 where it is determined whether or not the process is completed for all of the blocks. If there are blocks that still have not been processed yet, the process proceeds to step S318 where the variable i is increased by one, and returns to step S304 so as to repeat the process.

When the process is completed for all of the blocks, the process proceeds to step S320 where a non-ejection nozzle is identified from the following expression (5) on the basis of the identification number i of the block and the row number k recorded in the aforementioned step S310.

$$\text{Non-Ejection Nozzle Number}=(i-1)\times N+k \qquad (5)$$

For example, since the third row in block 1 is blank in the example shown in FIG. 12, i=1 and k=3 are substituted into the expression (5) so as to determine that a non-ejection-nozzle number i "3". In addition, since the twelfth row in block 2 is also blank, i=2 and k=12 are substituted into the expression (5) so as to determine that a non-ejection-nozzle number is "26".

Although the exemplary embodiment described above is directed to an example in which a liquid-droplet ejecting apparatus forms an image (including a character) on recording paper, the recording medium is not limited to recording paper, and the liquid to be ejected is not limited to ink liquid. For example, the exemplary embodiment can also be applied to other types of liquid-droplet ejecting apparatuses, such as a pattern forming apparatus that ejects liquid droplets onto a sheet-like substrate for forming a pattern for, for example, a semiconductor or a liquid-crystal display.

Furthermore, the exemplary embodiment described above is directed to a case where a non-ejection nozzle is to be identified. Alternatively, based on the shape, the density, and the position of the linear patterns in each block or of the respective row numbers, an ejection nozzle with a displaced liquid-droplet landing position, a defective ejection nozzle with insufficient density, or normal ejection nozzles from which liquid droplets are normally ejected may be identified.

Furthermore, although the image forming apparatus according to the exemplary embodiment of the invention is applied to a liquid-droplet ejecting apparatus as an example in the above description, the image forming apparatus may alternatively be applied to an LED printer or a thermal printer. An LED printer to which the exemplary embodiment of the invention is applied includes multiple light-emitting elements arrayed in a predetermined direction and serving as recording elements, an exposure unit that forms an electrostatic latent image on a photoconductor by causing the light-emitting elements to emit light in accordance with input pixel values, and a developing unit that develops the electrostatic latent image formed on the exposure unit so as to form an image. In this case, with the application of the exemplary embodiment, a light-emitting element from which light is not properly emitted or a defective light-emitting element can be identified. A thermal printer to which the exemplary embodiment of the invention is applied includes multiple thermal heads arrayed in a predetermined direction and serving as recording elements, and applies voltage to the recording elements in accordance with input pixel values and presses the recording elements against thermal recording paper so as to form an image thereon. In this case, with the application of the exemplary embodiment, a thermal head that is not properly driven or a thermal head with insufficient pressing force can be identified.

Although the patterns corresponding to the recording elements according to the exemplary embodiment of the invention are linear patterns in the above description, the patterns may alternatively be, for example, slender elliptical patterns extending in the transport direction (i.e., second direction) of the recording paper.

Although the ejection nozzles are arrayed in a single line in the exemplary embodiment described above, as shown in FIG. 5, a recording head with a two-dimensional array of ejection nozzles that can form an image with higher resolution may be used as an alternative.

Although a program is provided in a preinstalled state in the exemplary embodiment described above, the program may alternatively be provided by being stored in a storage medium, such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

an image forming unit that includes a plurality of recording elements arrayed in a first predetermined direction and drives the recording elements in accordance with input image information so as to form an image on a recording medium that moves relatively to the recording elements in a second direction orthogonal to the first direction;

a reading unit that reads the image formed by the image forming unit via an optical system and outputs read data;

a controller that controls the image forming unit so as to form a detection pattern in a detection-pattern region located upstream or downstream, in the second direction, of a region where the image according to the input image information is formed in the recording medium such that other images are not continuous with the detection pattern, the detection pattern including stepped patterns arranged such that ends thereof are aligned with each other in the first direction, the stepped patterns respectively corresponding to a plurality of groups of the recording elements obtained by dividing the plurality of recording elements arrayed in the first direction into groups that include the same number of successively-arrayed recording elements, the stepped patterns each including patterns having the same length and extending in the second direction, the patterns included in each stepped pattern respectively corresponding to the recording elements included in the corresponding group of the recording elements, the patterns being arranged such that front and rear ends of patterns corresponding to adjacent recording elements are connected to each other; and an identifying unit that identifies a target recording element on the basis of read data obtained by reading the detection pattern using the reading unit, the identifying unit extracts a pattern region where the detection pattern is formed from the read data obtained by reading the detection pattern and segments the pattern region into a plurality of blocks in the first direction so that each block has a width that corresponds to a width of each group of the recording elements, wherein the identifying unit segments each of the blocks into a plurality of rows in the second direction such that the number of rows corresponds to the number of recording elements included in each group, and wherein the identifying unit identifies the recording elements corresponding to the patterns on the basis of the blocks and the rows.

2. The image forming apparatus according to claim 1, wherein the identifying unit detects the density of the read data from an inside toward an outside of the detection-pattern region and detects an edge of the detection pattern on the basis of a change in the density so as to extract a region surrounded by the edge as the pattern region.

3. The image forming apparatus according to claim 2, wherein, based on the read data, the identifying unit sequentially calculates a first average value of a predetermined lower percentage of the density of pixels on a line extending in the first direction from the inside toward the outside of the detection-pattern region in the second direction and detects a position where the first average value exceeds a first predetermined threshold value as an edge in the second direction, and wherein the identifying unit sequentially calculates a second average value of the density of pixels on a line extending parallel to the stepped patterns from the inside toward the outside of the detection-pattern region in the first direction, and if the second average value continuously exceeds a second predetermined threshold value over a width larger than the width of each block, the identifying unit detects a position where the second average value exceeds the second threshold value as an edge in the first direction.

4. The image forming apparatus according to claim 3, wherein the identifying unit sets the first threshold value and the second threshold value on the basis of a density histogram of pixels in the read data within the detection-pattern region.

5. The image forming apparatus according to claim 1, wherein the identifying unit sets a threshold value for identifying the formation state by the recording elements on the basis of a density histogram of pixels in the read data.

6. The image forming apparatus according to claim 2, wherein the identifying unit sets a threshold value for identifying the formation state by the recording elements on the basis of a density histogram of pixels in the read data.

7. The image forming apparatus according to claim 3, wherein the identifying unit sets a threshold value for identifying the formation state by the recording elements on the basis of a density histogram of pixels in the read data.

8. The image forming apparatus according to claim 4, wherein the identifying unit sets a threshold value for identifying the formation state by the recording elements on the basis of the density histogram of the pixels in the read data.

9. A non-transitory computer readable medium storing a program causing a computer to execute a process for forming an image, the process comprising:

driving a plurality of recording elements arrayed in a first predetermined direction in accordance with input image information so as to form the image on a recording medium that moves relatively to the recording elements in a second direction orthogonal to the first direction;

reading the formed image via an optical system and outputting read data;

performing control to form a detection pattern in a detection-pattern region located upstream or downstream, in the second direction, of a region where the image according to the input image information is formed in the recording medium such that other images are not continuous with the detection pattern, the detection pattern including stepped patterns arranged such that ends thereof are aligned with each other in the first direction, the stepped patterns respectively corresponding to a plurality of groups of the recording elements obtained by dividing the plurality of recording elements arrayed in the first direction into groups that include the same number of successively-arrayed recording elements, the stepped patterns each including patterns having the same length and extending in the second direction, the patterns included in each stepped pattern respectively corresponding to the recording elements included in the corresponding group of the recording elements, the patterns being arranged such that front and rear ends of patterns corresponding to adjacent recording elements are connected to each other; and identifying a target recording element on the basis of read data obtained by reading the detection pattern, extracting a pattern region where the detection pattern is formed from the read data obtained by reading the detection pattern and segments the pattern region into a plurality of blocks in the first direction so that each block has a width that corresponds to a width of each group of the recording elements, wherein each of the blocks are segmented into a plurality of rows in the second direction such that the number of rows corresponds to the number of recording elements included in each group, and identifying the recording elements corresponding to the patterns on the basis of the blocks and the rows.

10. An image forming method comprising:

driving a plurality of recording elements arrayed in a first predetermined direction in accordance with input image information so as to form an image on a recording medium that moves relatively to the recording elements in a second direction orthogonal to the first direction;

reading the formed image via an optical system and outputting read data;

performing control to form a detection pattern in a detection-pattern region located upstream or downstream, in the second direction, of a region where the image according to the input image information is formed in the recording medium such that other images are not continuous with the detection pattern, the detection pattern including stepped patterns arranged such that ends thereof are aligned with each other in the first direction, the stepped patterns respectively corresponding to a plurality of groups of the recording elements obtained by dividing the plurality of recording elements arrayed in the first direction into groups that include the same number of successively-arrayed recording elements, the stepped patterns each including patterns having the same length and extending in the second direction, the patterns included in each stepped pattern respectively corresponding to the recording elements included in the corresponding group of the recording elements, the patterns being arranged such that front and rear ends of patterns corresponding to adjacent recording elements are connected to each other; and identifying a target recording element on the basis of read data obtained by reading the detection pattern, extracting a pattern region where the detection pattern is formed from the read data obtained by reading the detection pattern and segments the pattern region into a plurality of blocks in the first direction so that each block has a width that corresponds to a width of each group of the recording elements, wherein each of the blocks are segmented into a plurality of rows in the second direction such that the number of rows corresponds to the number of recording elements included in each group, and identifying the recording elements corresponding to the patterns on the basis of the blocks and the rows.

* * * * *